(12) United States Patent
Fasen et al.

(10) Patent No.: US 8,284,522 B2
(45) Date of Patent: Oct. 9, 2012

(54) NON-RADIAL BEARING PRELOAD

(75) Inventors: Donald J. Fasen, Boise, ID (US); James C. Anderson, Eagle, ID (US); Stefan Bendekovits, Vienna (AT); Marc-Roman Humann, Breitenbrunn (AT)

(73) Assignee: Hewlett-Packard Development Company, L.P., Houston, TX (US)

( * ) Notice: Subject to any disclaimer, the term of this patent is extended or adjusted under 35 U.S.C. 154(b) by 1014 days.

(21) Appl. No.: 12/251,797

(22) Filed: Oct. 15, 2008

(65) Prior Publication Data

US 2010/0091411 A1    Apr. 15, 2010

(51) Int. Cl.
G11B 5/55 (2006.01)
(52) U.S. Cl. .................................... 360/261.1
(58) Field of Classification Search .............. 360/81, 360/260, 261.1, 245.9
See application file for complete search history.

(56) References Cited

U.S. PATENT DOCUMENTS

| | | | | |
|---|---|---|---|---|
| 4,444,069 A | * | 4/1984 | Dangschat | 476/11 |
| 4,703,377 A | * | 10/1987 | Hazebrouck | 360/266.2 |
| 5,105,322 A | * | 4/1992 | Steltzer | 360/261.3 |
| 5,105,419 A | * | 4/1992 | Ogura et al. | 720/680 |
| 5,305,299 A | * | 4/1994 | Maeda | 720/680 |
| 5,375,115 A | * | 12/1994 | Shimegi et al. | 720/679 |
| 5,621,583 A | * | 4/1997 | Parks et al. | 360/81 |
| 5,739,975 A | * | 4/1998 | Parks et al. | 360/81 |
| 5,761,183 A | * | 6/1998 | Ikegame | 369/220 |
| 6,219,204 B1 | * | 4/2001 | Kabasawa | 360/266.6 |
| 6,765,859 B2 | * | 7/2004 | Akiba | 369/249.1 |
| 7,948,715 B2 | * | 5/2011 | Yeakley et al. | 360/261.1 |
| 2002/0080531 A1 | * | 6/2002 | Inoguchi et al. | 360/261.1 |
| 2005/0063099 A1 | * | 3/2005 | West et al. | 360/261.1 |

* cited by examiner

Primary Examiner — Angel A. Castro

(57) ABSTRACT

A system and method for reducing resonance in a data transfer system are herein disclosed. A data transfer system comprises a bearing and a guide member. The bearing further comprises an outer ring. The guide member is arranged relative to the bearing so as to guide the outer ring for movement relative to the guide member, and to induce an axial preload in the bearing assembly.

20 Claims, 3 Drawing Sheets

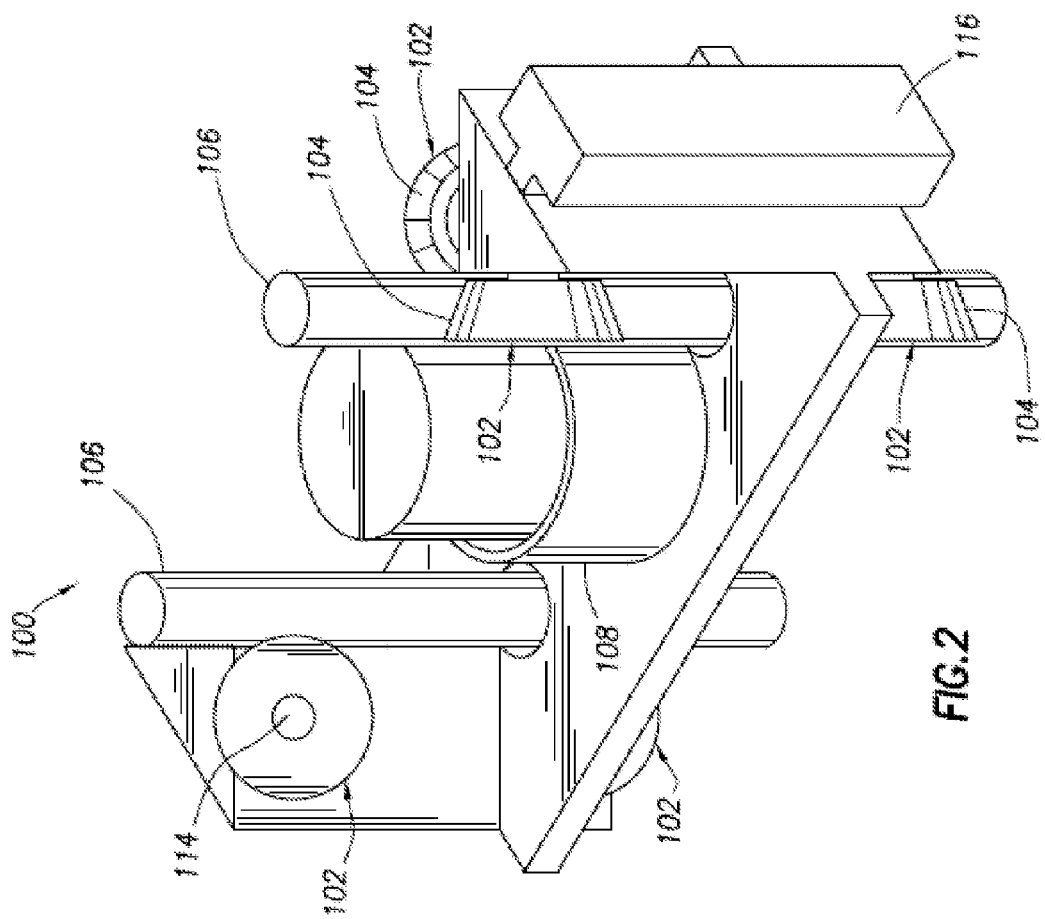
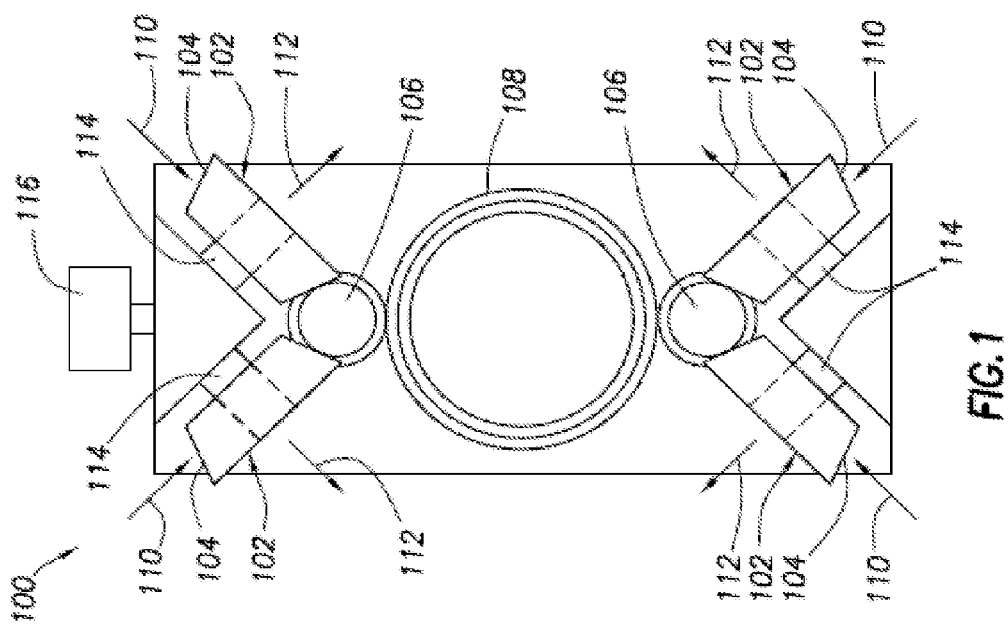

BEARING WITH AXIAL PRELOAD

SIDES OF OUTER RING

NON-RADIAL BEARING PRELOAD

BACKGROUND

Magnetic storage devices are often included in computer systems to provide high capacity secondary storage or data archival. Magnetic tape systems are a type of magnetic storage. Magnetic tape systems are widely used because they provide high storage densities while employing low cost media.

A magnetic tape system generally comprises a recording media, magnetic tape, and a media access device known as a tape drive or tape transport that reads data from and writes data to the magnetic tape. A magnetic tape typically comprises a flexible narrow ribbon of a base material (e.g., polyester films such as polyethylene naphthalate or polyethylene tereohthalate), and a magnetic material, such as a metal particulate, affixed to the base material by a binding agent (e.g., vinyl chloride polymer). The tape drive accesses the magnetic tape as the tape passes over a set of transducers or sensor elements affixed to a head assembly. Write elements generate magnetic fields which encode data onto the tape as the tape passes over the head. Read elements sense the magnetic fields of the tapers magnetic material to read data from the tape.

Linear tape systems employ multiple data tracks that run parallel to one another over a length of the tape. Such tapes often include more data tracks than the tape drive has head elements. These systems use a serpentine recording method wherein a first set of data tracks is written as the tape moves across the head in a forward direction, and a second set of data tracks is written as the tape moves across the head in the reverse direction. Many direction reversals may be required to write a tape with hundreds or thousands of tracks.

Tape density has increased manyfold over the years and the future portends no abatement of this trend. One method for increasing tape density in linear tape systems involves increasing the number of data tracks on the tape. Because tape width is fixed increasing the number of data tracks requires that the tracks be narrowed. Narrower data tracks unfortunately cause a design burden on the tape drive's head control system, in that the head positioning control loop bandwidth must be increased to reduce the head positioning tracking noise.

BRIEF DESCRIPTION OF THE DRAWINGS

For a detailed description of exemplary embodiments of the invention, reference will now be made to the accompanying drawings in which:

FIG. 1 shows a top view of an actuator assembly including a ramped surface on the bearing outer race for reducing actuator resonances in accordance with various embodiments;

FIG. 2 shows a perspective view of an actuator assembly including a ramped surface on the bearing outer race for reducing actuator resonances in accordance with various embodiments;

NOTATION AND NOMENCLATURE

Figure 3:
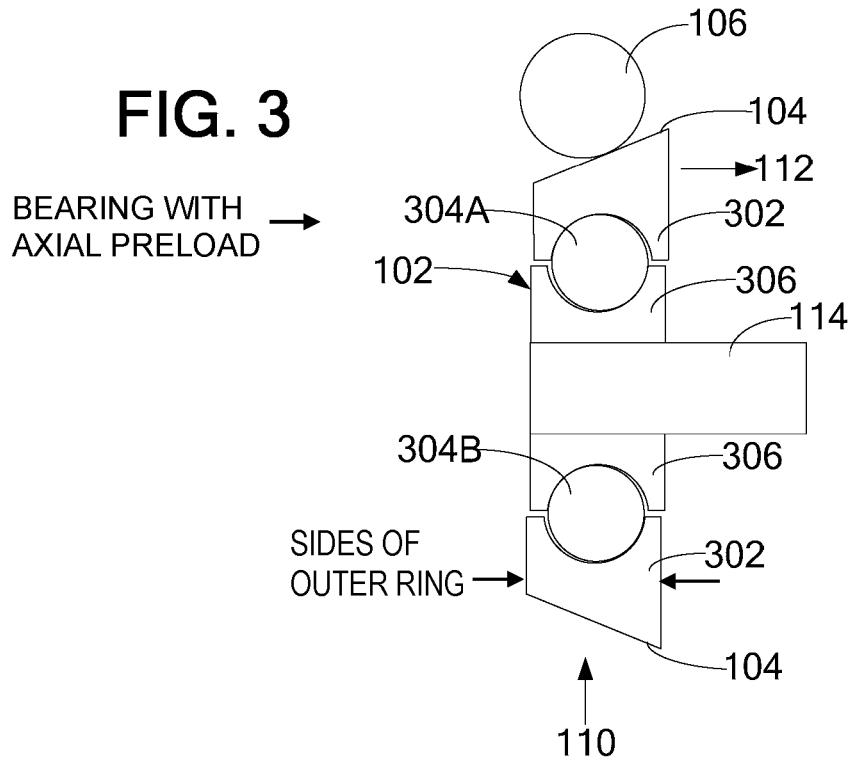
FIG. 3 shows a bearing including a tapered outer race for inducing non-radial preload in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. For example, while generally described in terms of application to magnetic tape systems, those skilled in the art will understand that embodiments are applicable to a wide variety of storage systems using media access assembly actuators (e.g., magnetic disk, optical disk, or optical tape).

Increasing tape density by increasing the number of data tracks on a tape necessitates narrowing the data tracks. In order to make effective use of such narrowed data tracks, it is desirable to improve the head positioning accuracy of tape drives. Linear tape systems, for example tape systems compliant with the Linear Tape Open ("LTO") standard, align their tape head to the tape media using a head positioning control loop that causes the head to follow a servo pattern written onto the tape at manufacture. The force generated by driving a current into the moving coil of a voice coil motor type of actuator may be employed to move the head across the tracks on the tape. A large range of motion, for example a 13 mm stroke, is required to position the head over the entire tape surface. Some embodiments of an actuator enable such range of motion by including a set of bearings (e.g., ball bearings) traveling on guide rails. In some embodiments the guide rails are cylindrical. To allow for geometry variations in the rail and bearing placements, embodiments include a spring loaded bearing preload assembly to force the bearings against the guide rails over the entire stroke of the actuator. If an embodiment generates only a radial force preload on a bearing, the components of the bearing on the side of the bearing opposite the guide rail, (e.g., the bearing outer race and roller elements) will be unconstrained in one or more directions. For example, the bearing outer race may be free to move axially, and the roller elements may be free to move radially and axially. If the bearing is unconstrained axially, then at certain frequencies, axial motion can be excited and produce an undesirable resonance that limits the control loop bandwidth.

Increasing the bandwidth of a tape storage device's head positioning control system helps to reduce head positioning tracking noise and increase the capacity of device. Actuator resonances are a major limiter to achievable control loop bandwidth. The bearings and their preload are one cause of actuator resonances. Embodiments of the present disclosure employ a bearing preload method that includes non-radial as well as radial preload to reduce actuator resonances. Reducing the magnitude of the actuator resonances allows for wider control loop bandwidth and better tracking between the head and the tape data tracks. Improved tracking allows for narrower data tracks and higher storage capacity for a given length of tape.

FIG. 1 shows a top view of an actuator assembly 100 including a ramped surface 104 on the bearing 102 outer ring (i.e., race) for reducing actuator resonances in accordance with various embodiments. The exemplary actuator assembly 100 includes head 116 for accessing a storage medium (e.g., a magnetic tape). The actuator provides head motion by applying a voice coil motor ("VCM"). The coil 108 of the VCM is shown, while, for simplicity, the magnet is omitted. VCMs are well known to those skilled in the art and their operation need not be explained here. The actuator 100 further includes a set of bearings 102. Each bearing 102 is mounted on a shaft 114 that engages the inner ring (i.e., race) of the bearing 102. A preload force 110 is radially applied to each bearing 102. In at least some embodiments, the radial preload force 110 is applied via the shaft 114. The radial preload force 110 causes the outer surface of the outer race of each bearing 102 to engage a guide member 106. In an embodiment employing only radial preloading, axial motion in the bearing is unconstrained, allowing undesirable resonance in the actuator assembly. Such resonance reduces control loop bandwidth and ultimately limits the capacity of the actuator to accurately position the head relative to the storage medium.

Some embodiments of the present disclosure include an oblique surface 104 on the outer race of the each bearing 102. The inclined surface 104 contacts the guide member 106 when the bearing 102 is pressed against the guide member 106 by the bearing preload force 110. Rather than generating only a radial force in the bearing race and rolling elements, a radial force and a non-radial force 112 are generated. The non-radial force 112 causes the rolling elements of the bearing 102 to be pressed against surfaces of both the inner and outer races of the bearing 102 on the guide member 106 side of the bearing 102 and the side of the bearing 102 opposite the guide member 106. The addition of the non-radial constraining force 112 reduces resonances in the actuator 100 allowing wider control bandwidth. The ramped surface 104 added to the bearing 102 allows for generation of a non-radial preload force 112 in a manufacturable manner, i.e., without requiring impractically precise alignment of the bearing 102 and the guide member 106. In some embodiments, the inclined outer surface 104 of the bearing outer race may, for example, be at a 30° angle to the bearing axis. However, embodiments of the present disclosure are not limited to any particular angle.

FIG. 3 shows a bearing including a tapered outer race for inducing non-radial preload in accordance with various embodiments. The bearing 102 of FIG. 3 comprises inner race 306, outer race 302, and balls 304A, 304B serving as rolling elements, though embodiments are not limited to any particular type of rolling element. The inner race 306 of the bearing 102 is engaged with shaft 114. Radial preload force 110 is applied to the bearing 102. The radial preload force 110 may be applied to the bearing 102 by, for example, applying a force perpendicular to the axis of rotation of the bearing 102 and the guide member 106 (i.e., direction 110) to the shaft 114. Thus, the radial preload force 110 can be applied through the shaft 114. Application of the preload force 110 causes the outer surface 104 of the outer race 302 of the bearing 102 to make contact with the guide member 106. The outer surface 104 of the outer race 302 is inclined (i.e., ramped). Contact between the guide member 106 and the inclined surface 104 creates non-radial force 112. As shown, application of non-radial force 112 to the outer race 302 of the bearing 102 causes the outer race 302 to twist (i.e., to rotate towards the shaft 114) and become slightly misaligned with the inner race 306. Twisting the outer race 302 removes clearance around ball 304B, and causes the ball 304B to contact both inner race 306 and outer race 302. Thus, the ball 304B and the outer race 302 are constrained. In embodiments lacking non-radial preload force 112, the outer race 302 around the ball 304B is unconstrained and free to vibrate axially, enabling undesirable resonances and control loop bandwidth limitations. At least some embodiments of the present disclosure provide improved control loop bandwidth, and consequently allow for increased medium storage capacity by applying non-radial preload force 112 enabled by angled surface 104 of the outer race 302.

Figure 4:
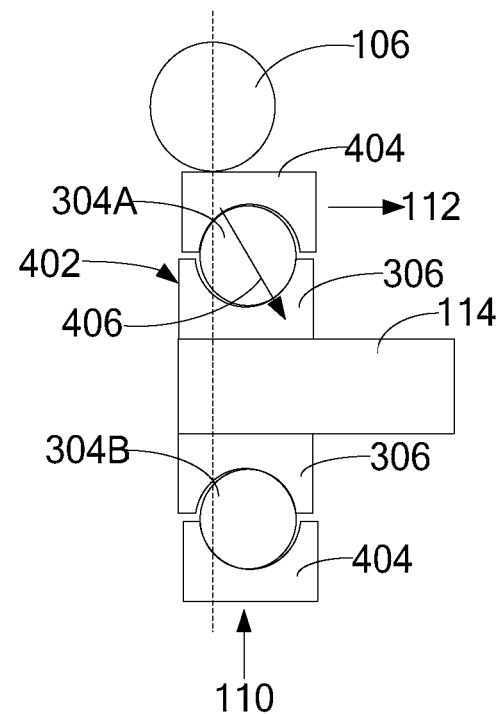
FIG. 4 shows a system wherein the guide member induces a non-radial preload in a bearing in accordance with various embodiments.

FIG. 4 shows a system wherein the guide member 106 induces a non-radial preload in a bearing 402 in accordance with various embodiments. The bearing 402 of FIG. 4 comprises inner race 306, outer race 404, and balls 304A, 304B serving as rolling elements, though embodiments are not limited to any particular type of rolling element. The bearing 402 does not include a tapered outer surface on the outer race 404. The inner race 306 of the bearing 402 is engaged with shaft 114. Radial preload force 110 is applied to the bearing 402. In some embodiments, the force 110 is applied through the shaft 114. Application of the preload force 110 causes the outer surface of the outer race 404 of the bearing 402 to make contact with the guide member 106. The bearing 402 is positioned relative to the guide member 106 such that contact with the guide member 106 induces force 406 in the bearing 402. In some embodiments, the center of contact between the guide member 106 and the outer race 404 is a point not equidistant from the sides of the outer race 404. Force 406 includes a non-radial component 112. For purposes of illustration, contact between the guide member 106 and the bearing outer race 404 is shown at a specific point on the outer race 404. However, the illustrated contact point is exemplary, and embodiments encompass various contact points between the guide member 106 and the outer race 404 that induce a non-radial preload force 112 in the bearing 402.

As shown in FIG. 4, application of non-radial force 112 to the outer race 404 of the bearing 402 causes the outer race 404 to twist and become slightly misaligned with the inner race 306. Twisting the outer race 404 removes clearance around ball 304B, and causes the ball 304B to contact both inner race 306 and outer race 404. Thus, the ball 304B and the outer race 404 are constrained. In embodiments lacking non-radial preload force 112, the ball 304B and the outer race 302 adjacent to the ball 304B are unconstrained and free to move, enabling undesirable resonances and control loop bandwidth limitations. At least some embodiments of the present disclosure provide improved control loop bandwidth, and consequently allow for increased medium storage capacity by applying non-radial preload force 112 induced by contact between the outer race 404 and the guide member 106.

Embodiments of the system of FIG. 4 may be applied to actuator 100 by replacing bearing 102 with bearing 402 wherein the point of contact between the guide member 106 and the outer race 404 induces non-radial preload force 112.

Figure 5:
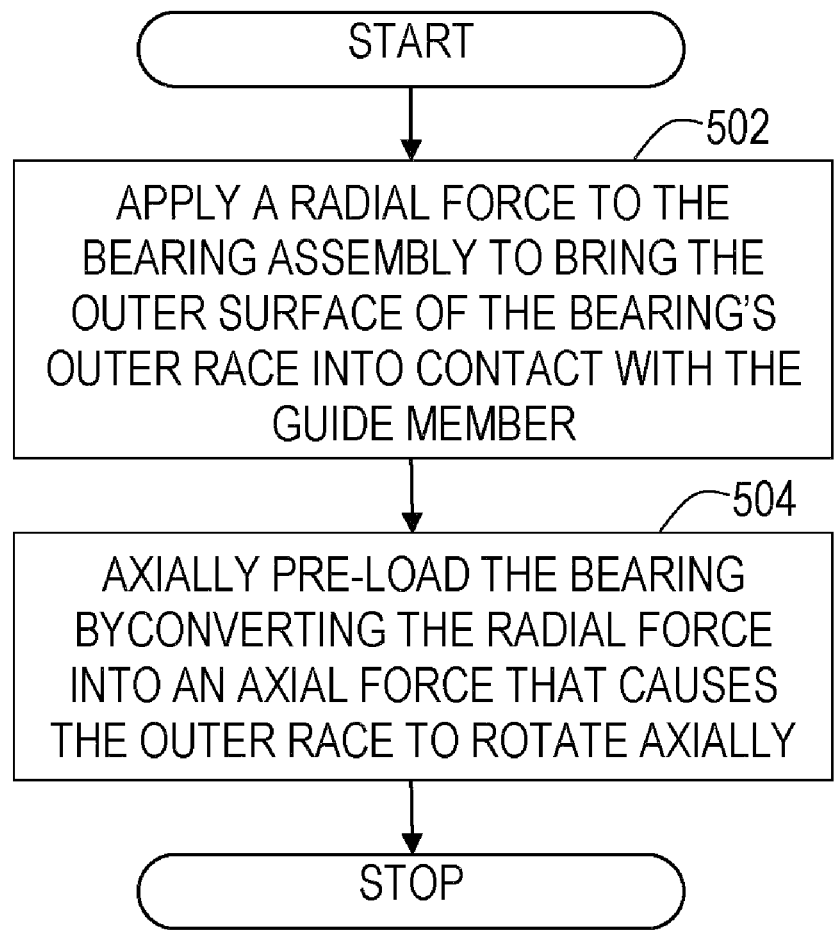
FIG. 5 shows a flow diagram for a method for reducing actuator resonance in accordance with various embodiments.

FIG. 5 shows a flow diagram for a method for reducing actuator 100 resonance in accordance with various embodiments. Though depicted sequentially as a matter of convenience, at least some of the actions shown can be performed in a different order and/or performed in parallel. In block 502, a radial force 110 is applied to an actuator bearing assembly 102, 402. The radial force 110 causes the outer surface of the bearing outer race to contact an actuator guide member 106. In at least some embodiments, the bearing 102, 402 rolls along the guide member 106 as current applied to the VCM 108 causes the actuator to move the head 116.

In block 504, at least a portion of the radial force 110 applied to the bearing 102, 402 is converted into an axial force 112. In one embodiment, the tapered surface 104 of the bearing 102 outer race 302 serves to affect the conversion of radial force 110 to axial force 112. In another embodiment, a point of contact between the guide member 106 and the outer race 404 is selected to induce the axial force 112. The axial force 112 provides non-radial pre-loading to the bearing 102. The axial force 112 is applied to the outer race 302 contacting the guide member 106, and causes the outer race 302 to rotate in the direction of the force 112. The rotation of the outer race 302 causes the outer race 302 to move out of alignment with the inner race 306. The rotation and consequent misalignment of the inner race 306 and the outer race 302 causes a rolling element 304B on the side of the bearing 102 opposite the guide member 106 to contact both the inner race 306 and the outer race 302. As the bearing 304B is pressed between the inner race 306 and the outer race 302, the outer race 302 is restricted from vibrating axially. By constraining the outer race 302 by non-radial preload force 112, the rigidity of the bearing 102 is increased and the resonance modes in the actuator 100 are reduced, allowing for more precise tracking and higher medium storage density.

The above discussion is meant to be illustrative of the principles and various embodiments of the present invention. Numerous variations and modifications will become apparent to those skilled in the art once the above disclosure is fully appreciated. For example, those skilled in the art will understand that embodiments of the present disclosure, though discussed above primarily by reference to magnetic tape systems, are applicable to reducing resonance in a variety of actuator systems in data storage and other devices. Further, while balls are mentioned herein in reference to bearing rolling elements, any number of other rolling element geometries known in the art may be used. It is intended that the following claims be interpreted to embrace all such variations and modifications.

What is claimed is:

1. A data transfer system, comprising:
   a bearing assembly comprising:
      an outer ring comprising a flat outer face; and
      a shaft disposed along an axis of rotation of the bearing assembly;
   a guide member arranged relative to the bearing assembly so as to:
      guide the outer ring for movement relative to the guide member; and
      apply a force to the outer face, the force perpendicular to the shaft and perpendicular to the guide member;
   wherein the outer ring converts a portion of the applied force to an axial force thereby axially pre-loading the bearing assembly.

2. The data transfer system of claim 1, wherein the guide member is arranged to contact the outer ring at a point of the outer ring wherein the contact produces a force in the direction of the axis of rotation in the outer ring.

3. The data transfer system of claim 1, wherein the guide member is arranged such that the center of contact with the outer ring is a point not equidistant from axially offset sides of the outer ring, and wherein a surface of the outer ring in contact with the guide member extends linearly across the outer ring from the axially offset sides.

4. The system of claim 3, wherein the outer ring comprises a first ring and a second ring, the outer surface of the second ring is tapered across the second ring, and the inner surface of the second ring is affixed to the outer surface of the first ring.

5. The data transfer system of claim 1, wherein the outer surface of the outer ring is oblique to the axis of rotation of the bearing assembly.

6. The system of claim 1, wherein the axial preload constrains axial motion of the bearing assembly.

7. The system of claim 1, further comprising a shaft engaged with an inner ring of the bearing assembly, wherein the axial preload rotates the outer ring towards the shaft.

8. An actuator system, comprising:
   a bearing comprising:
      a shaft; and
      an outer race that rotates about the shaft, the outer race comprising
         a flat outer surface extending from side to side of the outer race; and
      a guide member in contact with the outer surface;
   wherein the guide member applies a force to the outer race, the force perpendicular to the shaft and perpendicular to the guide member;
   wherein the outer race converts at least a portion of the applied force to an axial force that reduces resonance in the actuator system by axially pre-loading the bearing.

9. The system of claim 8, wherein the flat outer surface is parallel to the shaft and the guide member contacts the flat outer surface at a single off-center point of the flat outer surface.

10. The system of claim 8, wherein the flat outer surface is tapered.

11. The system of claim 8, wherein the actuator system is a component of a tape drive, and is configured to move a tape head.

12. The system of claim 8, wherein the outer race contacts the guide member, and the contact produces a force in a direction of an axis of rotation of the bearing.

13. The system of claim 8, wherein the guide member contacts the outer race at a point laterally disposed from a centerline of the outer ring.

14. The system of claim 8, wherein the bearing further comprises an inner race and a plurality of rolling elements disposed between the inner race and the outer race, and the axial force reduces clearance between the rolling elements and the outer and inner rings throughout the bearing.

15. The system of claim 8, wherein the outer race comprises a ramped surface that contacts the guide member, contact of the ramped surface with the guide member causing the axial force.

16. A tape drive, comprising:
   an actuator assembly that moves a tape head, the actuator assembly comprising:
      a bearing comprising:
         a shaft; and
         an outer race that rotates about the shaft, the outer race comprising a flat outer surface; and
      a guide member that applies a force perpendicular to the shaft, to the outer surface;
   wherein the outer race converts the applied force to an axial preload force in the bearing.

17. The tape drive of claim 16, wherein the outer ring contacts the guide member, and the contact produces a force in the direction of the axis of rotation of the bearing.

18. The tape drive of claim 16, wherein the guide member contacts the outer ring at a point laterally disposed from a centerline of the outer ring.

19. The tape drive of claim 16, wherein the bearing further comprises an inner ring and a plurality of rolling elements disposed between the inner ring and the outer ring, and the axial preload force reduces clearance between the rolling elements and the outer and inner rings throughout the bearing.

20. The tape drive of claim 16, wherein the outer ring comprises a ramped surface that contacts the guide member, contact of the ramped surface with the guide member causing the axial pre-load force.

* * * * *